United States Patent
Adari

(10) Patent No.: US 10,915,949 B2
(45) Date of Patent: Feb. 9, 2021

(54) REAL-TIME CREATION OF BANK ACCOUNT AND DISPENSING WELCOME KIT FOR THE BANK ACCOUNT THROUGH ATM

(71) Applicant: Swarna Kumari Adari, Visakhapatnam (IN)

(72) Inventor: Swarna Kumari Adari, Visakhapatnam (IN)

(73) Assignee: Swarna Kumari Adari, Andhra Pradesh (IN)

( * ) Notice: Subject to any disclaimer, the term of this patent is extended or adjusted under 35 U.S.C. 154(b) by 170 days.

(21) Appl. No.: 15/983,120

(22) Filed: May 18, 2018

(65) Prior Publication Data
US 2018/0268477 A1    Sep. 20, 2018

(30) Foreign Application Priority Data

Jul. 27, 2017 (IN) ............................. 201741026768

(51) Int. Cl.
| | | |
|---|---|---|
| G06Q 40/02 | (2012.01) | |
| G07F 19/00 | (2006.01) | |
| H04L 29/06 | (2006.01) | |
| G06Q 50/26 | (2012.01) | |
| G06F 21/60 | (2013.01) | |
| G06K 19/06 | (2006.01) | |

(52) U.S. Cl.
CPC .......... *G06Q 40/02* (2013.01); *G06F 21/604* (2013.01); *G06Q 50/265* (2013.01); *G07F 19/203* (2013.01); *H04L 63/0838* (2013.01); *G06K 19/06028* (2013.01); *G06K 19/06037* (2013.01)

(58) Field of Classification Search
CPC .... G06Q 20/18; G06Q 40/02; G06Q 20/4014; G06Q 20/354
See application file for complete search history.

(56) References Cited

U.S. PATENT DOCUMENTS

| | | | |
|---|---|---|---|
| 10,424,170 B1* | 9/2019 | Benkreira | G07F 17/42 |
| 2010/0123002 A1* | 5/2010 | Caporicci | G06Q 20/22 |
| | | | 235/380 |
| 2010/0123003 A1* | 5/2010 | Olson | G06Q 20/355 |
| | | | 235/380 |
| 2014/0263385 A1* | 9/2014 | Martin | G06Q 20/18 |
| | | | 221/1 |
| 2017/0116588 A1* | 4/2017 | Conant | G07F 17/42 |
| 2018/0322571 A1* | 11/2018 | Vea | G06Q 20/227 |

* cited by examiner

*Primary Examiner* — Sarah B McPartlin

(57) ABSTRACT

Described herein is a method and a system to create an account at a financial institution using a computing machine, in particular an automated teller machine (ATM). The computing machine enables an applicant to submit an application form along with a softcopy of an identification document, for creating or opening a new account at a financial institution. Based on the submitted application form and the softcopy of the identification document, the computing machine transmits the identification information of the applicant to a central server of the financial institution. In case of successful verification, the central server creates the account in real time, and the computing machine presents a confirmation of account creation to the applicant.

10 Claims, 4 Drawing Sheets

REAL-TIME CREATION OF BANK ACCOUNT AND DISPENSING WELCOME KIT FOR THE BANK ACCOUNT THROUGH ATM

FIELD OF DISCLOSURE

The present disclosure generally relates to computing machines. In particular, the present disclosure discloses a system and a method for creating a new account at a financial institution in real-time and instantly dispensing of an account opening envelope.

BACKGROUND OF THE DISCLOSURE

The background description includes information that may be useful in understanding the present disclosure. It is not an admission that any of the information provided herein is prior art or relevant to the invention claimed in the present disclosure, or that any publication specifically or implicitly referenced is prior art.

In recent years, financial services industry has become increasingly expanded. Financial institutions, such as Banks, now offer a wide variety of products and services which were previously not available to customers. Such expansion of products and services puts the financial institutions under significant pressures to facilitate these products and services to customers. However, nowadays, the customers have very minimal time to manage their money through regular interactions with the financial institutions. To overcome this issue and to facilitate the customers, the financial institutions have introduced a computing machine, in particular an automated teller machine (ATM) into the market. ATM is a computing machine that allows the customers of the financial institutions to perform financial transactions, say, cash withdrawal, cash deposit, account balance check, or retrieval of mini statements, without personally visiting the financial institutions. Thus, ATM offers the convenience of performing faster transactions. Further, ATMs are generally located at multiple locations and provide access to the financial institutions from any part of the world.

Traditionally, to open an account with a financial institution, an applicant must visit at a branch of the financial institution and deals with an appropriate official of the financial institution to complete the procedure of opening the account. Once the procedure for opening account is complete, the financial institution may take about a week to verify the documents and details submitted by the applicant during the procedure of opening the account, and, if everything is found in order, dispatch an account opening envelope to physical address of the applicant. Such procedure of opening an account is very tedious and time consuming. Also, for a large segment of people in our society, it a big challenge to open account and maintain that account by visiting the financial institution or branch office of that institute. In addition to such challenge, it is very difficult for a customer to visit a financial institution within its working hours and, in the financial institution, a customer is generally not entertained by institute's representative. Accordingly, there is a need of having a system and a method which may assist in opening an account with a financial institution, without any assistance of a human cashier, clerk, teller, or representative, of the financial institution.

Efforts have been made in the art to improve the process of opening an account in a financial institution. For instance, U.S. Pat. No. 5,866,889 describes a sales tool which includes a computer and a workstation for use at a bank branch by a personal banker to identify recommended products for a particular customer in a face-to-face session, and to assist in an account opening process. However, business hours of the banks are the biggest constraint. Customers seeks for banking services regardless of time and place using information and communication technologies, such as that developed without being bound by this restriction. Further, even if, a facility of 24×7 banking is provided, including facility for creating/opening a bank account, which is very rare, still it has a huge constraint by way of verification of documents submitted by the customer and thereby providing an account opening envelope having ATM card or credit card, associated Pin's and other documents on the spot.

Hence, in spite of techniques available in the art for creating new bank account either online or by visiting banks, such techniques majorly includes a process in which a tool can be used to create account in a bank branch office for particular customers. However, the above procedures necessitate that applicant/customer visits at a branch office of the bank to open/create an account. Further, it is often a challenge for receiving an account opening envelope, which includes bank associated document such as passbook, credit card, PIN, etc. after bank account opening instantly.

Although, there is certainly nothing wrong with the existing techniques for bank account creation mechanism; nonetheless, there still exists a need to overcome the problems as recited above, and a need to enable a bank account creation/opening facility through any accessible, proximate, and convenient systems or devices which further enables to verify in real-time the customer details submitted during the bank account creation and thereby dispense account opening envelope instantly after verification and/or account creation.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY

This summary is provided to introduce concepts related to opening an account with a financial institution using a computing machine. The concepts are further described below in the detailed description. This summary is not intended to identity key features or essential features of the claimed subject matter, nor is it intended to be used to limit the scope of the claimed subject matter.

In order to overcome the above problems and to technically fulfill the expectations of the customers, an objective of the present disclosure is to provide a new, technically advanced and improved method and system that not only enables applicants to open a new account using a computing machine but also enables the computing machine to dispense an account opening envelope.

According, to an aspect of the present disclosure, the method for creating an account with a financial institution using a computing machine is described herein. In one example, the computing machine can include, but not limited to, an automated teller machine, a standalone machine, a dedicated machine, a workstation, and a cash dispenser machine. The method begins with receiving a request, at the computing machine from an applicant, to create an account with a financial institution. Upon receipt of the request, the computing machine provides an application form, through an electronic interface of the computing machine, to the applicant for receiving identification information of the applicant. Once the applicant fills the identification information, the computing machine receives the identification information from the applicant by means of said form. Upon receipt of the identification information, the electronic interface of the computing machine prompts the applicant to submit an identification document. In response to the prompt, the applicant submits the identification document which is then scanned by the computing machine to capture at least a part of the identification information from the identification document. In an example, the identification document can include, but not limited to, a driving licensee, Permanent Account Number (PAN) card, Identity (ID) card, passport. Aadhar card, voting card, electricity bill and the like. Upon capturing the at least a part of the identification information, the computing machine transmits any or both of the identification information received from the applicant through the application form, and the at least a part of the identification information captured from the identification document, to a server of the financial institution. In an implementation, the server is configured to verify the identification information received from the applicant. Based on successful verification, the computing machine transmits an Account Confirmation One Time Password (ACOTP) to a commutation device number of the applicant, said ACOTP representing a confirmation of account creation to the applicant, where said account being created at the server.

In an aspect, once the customer receives and submits the ACOTP the account will be activated immediately (or within 24 hours) and then finally dispenses the instant kit.

In an aspect, after insertion of the identification document in the computing machine, a document scanner provided inside the computing machine captures at least a part of the identification information from the identification document. Once the at least a part of the identification information is captured, the identification document is ejected through the same scanning orifice or opening by the computing machine.

In an example, upon ejecting the identification document, the financial transaction engine(s) generates and transmits a Document Verification One Time Password (DVOTP) to applicant's communication device number submitted/filled in the application form. Following the transmission of the DVOTP, the financial transaction engine(s) prompts the applicant to submit the same for initiating the verification process. Once the DVOTP is received and validated by the financial transaction engine(s), the financial transaction engine(s) transmits any or both of the identification information received from the applicant through the application form, and the at least a part of the identification information captured from the identification document, to the server of the financial institution.

In an implementation of the aspect, upon presenting the confirmation of creation of the account, the computing machine associates one or more attributes of the identification information of the applicant with an account opening envelope present in the computing machine, and dispenses the account opening envelope from the computing machine.

According to a further aspect of the present disclosure, the computing machine for creating an account with a financial institution using a computing machine is described herein. In one example, the computing machine can be one of an automated teller machine, a standalone machine, a dedicated machine, a workstation, a smart phone, a cash dispenser machine, and a handheld device. The computing machine includes a non-transitory storage device having embodied therein one or more routines operable to open an account with a financial institution, and one or more processors coupled to the non-transitory storage device and operable to execute the one or more routines. The one or more routines include an interface module, a scan module, a verification module, and a registration module. The interface module provides an application form to the applicant for receiving identification information of the applicant. Once the identification information is received, the scan module receives the identification document in the computing machine to scan at least a part of the identification information from the identification document using a document scanner present in the computing machine. Then, the verification module transmits any or both of the identification information received from the applicant through the application form, and the at least a part of the identification information captured from the identification document, to a server of the financial institution. In an implementation, the server is configured to verify the identification information received from the applicant. Based on successful verification, the registration module or the server transmits an Account Confirmation One Time Password (ACOTP) to a communication device number of the applicant, said ACOTP representing a confirmation of account creation to the applicant, where said account being created at the server.

In an implementation, once the customer receives and submits the ACOTP the account will be activated immediately (or within 24 hours) and then finally dispenses the instant kit.

In an implementation of the further aspect, the computing machine includes a dispensing module to associate one or more attributes of the identification information of the applicant with an account opening envelope present in the computing machine, and dispense the account opening envelope from the computing machine.

In an implementation, the account created to the applicant is interoperable with at least one financial institution, and wherein the account created comprise of at least an account number configured to be interoperable with at least two financial institutions. For example, the account number or the account can be interoperable/portable with one or more banks i.e., if a person has an account created using the mechanism as disclosed in the present disclosure in Bank "X" with account number as "123456789", the person may use the same account number "123456789" when he decided to switch his bank form "X" to "Y" keeping the same account number. However, it may be appreciated that, even though the account number would remain same during portability, the other documents and debit/credit cards need to be again collected as per the mechanisms provided in the present disclosure.

Other and further aspects and features of the disclosure will be evident from reading the following detailed description of the embodiments, which are intended to illustrate, not limit, the present disclosure.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein, wherein:

DETAILED DESCRIPTION

Figure 1:
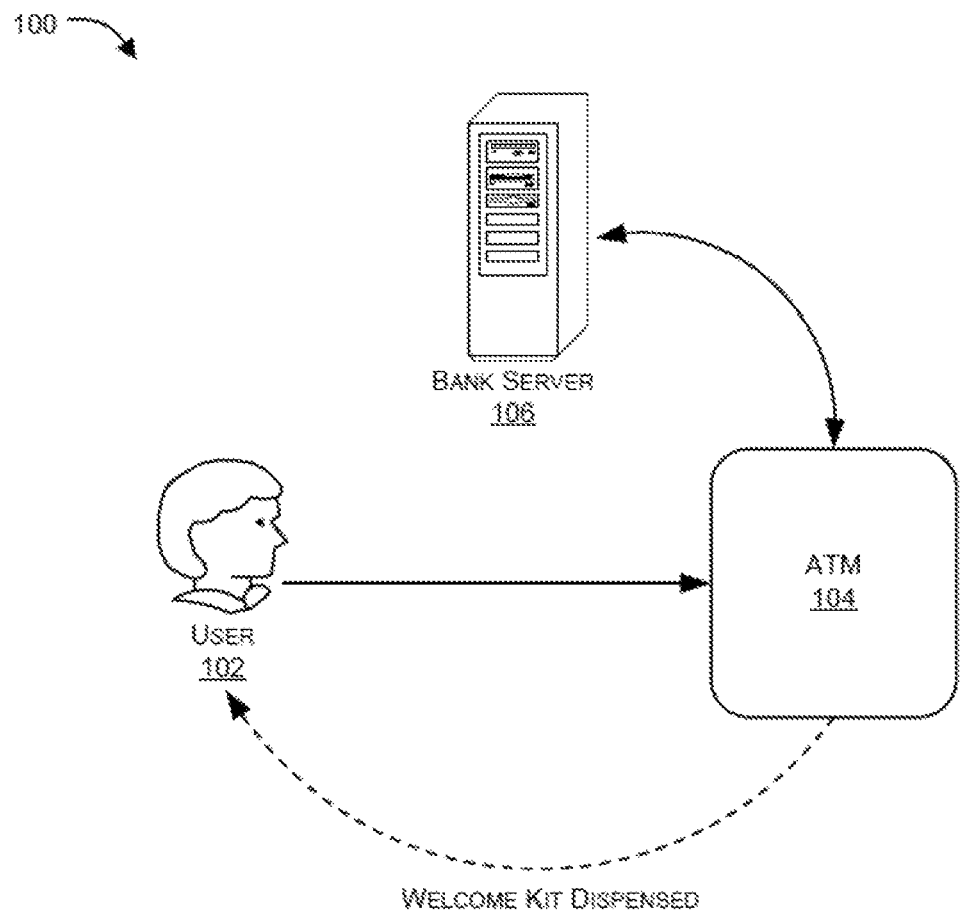
FIG. 1 illustrates an exemplary environment, wherein various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions:

Definitions of one or more terms that will be used in this disclosure are described below without limitations. For a person skilled in the art, it is understood that the definitions are provided just for the sake of clarity and are intended to include more examples than just provided below.

The term "computing machine" refers to a device or a combination of multiple devices configured to perform one or more functions including, but not limited to, cash withdrawal, cash deposit, account balance check, retrieval of mini statements, and so forth. The computing machine includes software, hardware, firmware, or combination thereof. In the context of current disclosure, the computing machine can include, but not limited to, automated teller machine (ATM), automated banking machine, cash dispensing machine, cash machine or hole-in-the-wall machine, standalone machine, multi-functional transaction machine, and the like. Further, in one example, the financial institution may include, but not limited to, a bank, a building society, a credit union, a trust company, a mortgage loan company, an insurance company, an investment bank a brokerage firm, and the like.

The term "account" refers to a financial account at a financial institution for maintaining or performing financial transactions with or through the financial institution.

The term "identification document" refers to documents proving the identity of a user, customer, or applicant associated with a financial institution. The identification document can include, but not limited to, driving licensee, Permanent Account Number (PAN) card, Identity (ID) card, passport card, Aadhar card, voting card, electricity bill and so forth.

The term "account opening envelope" refers to an envelope that is generally dispatched to a physical address of user or applicant by a financial institution personal once a new account is created for that user or applicant. The account opening envelope is colloquially known by terms such as welcome pack, welcome kit, bank kit, an instant kit, or account opening kit. The account opening envelope may include, but not limited to, a debit Card, a Credit Card, personal identification numbers (PINs), passbook, and so forth.

The following detailed description is provided with reference to the figures. Exemplary, and in some case preferred, embodiments are described to illustrate the disclosure, not to limit its scope, which is defined by the claims. Those of ordinary skill in the art will recognize a number of equivalent variations in the description that follows.

Overview:

The primary aim of the disclosure is to create an account at a financial institution using a computing machine, in particular an automated teller machine (ATM). The computing machine enables an applicant to submit an application form along with a softcopy of an identification document, for creating or opening a new account at a financial institution. Based on the submitted application form and the softcopy of the identification document, the computing machine transmits the identification information of the applicant to a central server of the financial institution for verification. In case of successful verification, the central server creates the account in real time, and the computing machine presents a confirmation of account creation to the applicant.

Thus, with the present disclosure, a computing machine becomes capable of creating a new account of an applicant with a financial institution. This not only creates a new account but reduces the paper work, thereby reducing errors and increasing the efficiency of the financial institutions. Overall, the proposed computing machine provides a more integrated system for recording account opening applications and activating accounts in real time. The integration and automation enabled by the proposed computing system increases accuracy and efficiency, as different financial institution's employees do not have to alternate between multiple electronic and paper systems to open/create the account, to prepare the account opening envelopes, and to dispatch the account opening envelopes to the applicants.

Exemplary Embodiments

Various embodiments are further described herein with reference to the accompanying figures. It should be noted that the description and figures relate to exemplary embodiments, and should not be construed as a limitation to the subject matter of the present disclosure. It is also to be understood that various arrangements may be devised that, although not explicitly described or shown herein, embody the principles of the subject matter of the present disclosure. Moreover, all statements herein reciting principles, aspects, and embodiments of the subject matter of the present disclosure, as well as specific examples, are intended to encompass equivalents thereof. Yet further, for the sake of brevity, operation or working principles pertaining to the technical material that is known in the technical field of the present disclosure have not been described in detail so as not to unnecessarily obscure the present disclosure.

FIG. 1 illustrates an exemplary environment 100, in which various embodiments of the present disclosure can be practiced. The environment 100 includes a user 102, a computing machine 104, a financial transaction engine(s) 104, and a server 106 of the financial institution. Various examples of the computing machine 104 may be considered as any processor enabled machine or device which performs one or more functions. An example of such a computing machine 102 include, but are not limited to, automated teller machines (ATMs), automated banking machines, cash dispensing machines, cash machines or hole-in-the-wall machines, standalone machines, multi-functional transaction machines. The present approaches may also be implemented in other types of computing machines without deviating from the scope of the present disclosure.

The computing machine 104 is coupled to the server 106 through a communication network (although not shown). The communication network may be a wireless network, a wired network or a combination thereof. The communication network may be implemented as one of the different types of networks, such as intranet, Local Area Network (LAN), Wide Area Network (WAN), the Internet, and the like. The communication network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the communication network may include a variety of network devices, including routers, bridges, servers, computing devices, storage devices, and the like.

As shown, the user 102 uses the computing machine 104 for creating an account at a financial institution. The user 102 uses the computing machine 104 for creating the account at the financial institution via a financial transaction engine(s) 108 running on the computing machine 104.

The financial transaction engine(s) 108 may be implemented as a combination of hardware and programming (for example, programmable instructions) to implement one or more functionalities of the financial transaction engine(s) 108. In exemplary embodiments or implementations described herein, such combinations of hardware and programming may be implemented in several different ways. For example, the programming for the financial transaction engine(s) 108 may be processor executable instructions stored on a non-transitory machine-readable storage medium and the hardware for the financial transaction engine(s) 108 may include a processing resource for example, one or more processors), to execute such instructions. In the present embodiments or implementations, the machine-readable storage medium may store instructions that, when executed by the processing resource, implement the financial transaction engine(s) 108. In such examples the computing machine 104 may include the machine-readable storage medium storing the instructions and the processing resource to execute the instructions, or the machine-readable storage medium may be separate but accessible to the computing machine 104 and the processing resource. In other examples, the financial transaction engine(s) 108 may be implemented by electronic circuitry. In context of the current disclosure, the financial transaction engine(s) 108 manages the process of creation of the account at the financial institution and this will be discussed below in more detail.

As shown, the user 102 submits an application form over an electronic interface (not shown in FIG. 1) of the computing machine 104, for creating the account with the financial account via the computing machine 104. Following the submission of the application form, the user 102 submits an identification document in a scanning orifice or opening (not shown in figures) provided in the computing machine 104. In an example, the in a scanning orifice or opening (not shown in figures) provided in the computing machine 104 includes, but not limited to, driving licensee, Permanent Account Number (PAN) card, Identity (ID) card, passport, Aadhar card, voting card, electricity bill and so forth.

After insertion of the identification document in the computing machine 104, a document scanner (not shown in FIG. 1) provided inside the computing machine 104 captures at least a part of the identification information from the identification document. Once the at least a part of the identification information is captured, the identification document is ejected through the same scanning orifice or opening by the computing machine 104.

In an example, upon ejecting the identification document, the financial transaction engine(s) 108 generates and transmits a Document Verification One Time Password (DVOTP) to applicant's communication device number submitted filled in the application form. Following the transmission of the DVOTP, the financial transaction engine(s) 108 prompts the applicant 102 to submit the same for initiating the verification process. Once the DVOTP is received and validated by the financial transaction engine(s) 108, the financial transaction engine(s) 108 transmits any or both of the identification information received from the applicant 102 through the application form, and the at least a part of the identification information captured from the identification document, to the server 106 of the financial institution.

In an implementation, the server 106 is configured to start verification of the identification information received from the applicant 102 and/or the at least a part of the identification information captured from the identification document, against applicant data maintained at the server 106, or at different respective authority websites, or both. Based on successful verification, the server 106 creates the account of the applicant in real time and transmits Account Confirmation One Time Password (ACOTP) to applicant's communication device number. Thereafter, the server 106 triggers the financial transaction engine(s) 108 to receive the ACOTP from the applicant 102 on the computing machine's interface. Once the customer receives and submits the ACOTP the account will be activated immediately (or within 24 hours) and then finally dispenses the instant kit.

Following the receiving of the ACOTP, financial transaction engine(s) 108 dispenses an account opening envelope, consisting of a debit Card, a Credit Card, personal identification numbers (PINs), passbook, and the like, from the computing machine 104.

However, in case of an unsuccessful verification at the server 106, the server 106 or the financial transaction engine(s) 108 generates a new account reference number (NARN) and transmits the same to applicant's communication device number. In an optional implementation, the financial transaction engine(s) 108 may also transmit a message to the applicant that 'verification is pending and financial institution personal will contact at the earliest' or only reference number. Then, the unsuccessful verification details may be forwarded to a dedicated financial institution personal so that the dedicated personal can contact with the applicant to complete the verification process. After successful completion of the pending verification, the financial transaction engine(s) 108 or the server 106 may communicate to the applicant to collect the account opening envelope from the computing machine 104. The account opening envelope may be dispensed by the computing machine 104 upon receipt of the ACOTP from the applicant. More details will be discussed with reference to the following figures.

Figure 2:
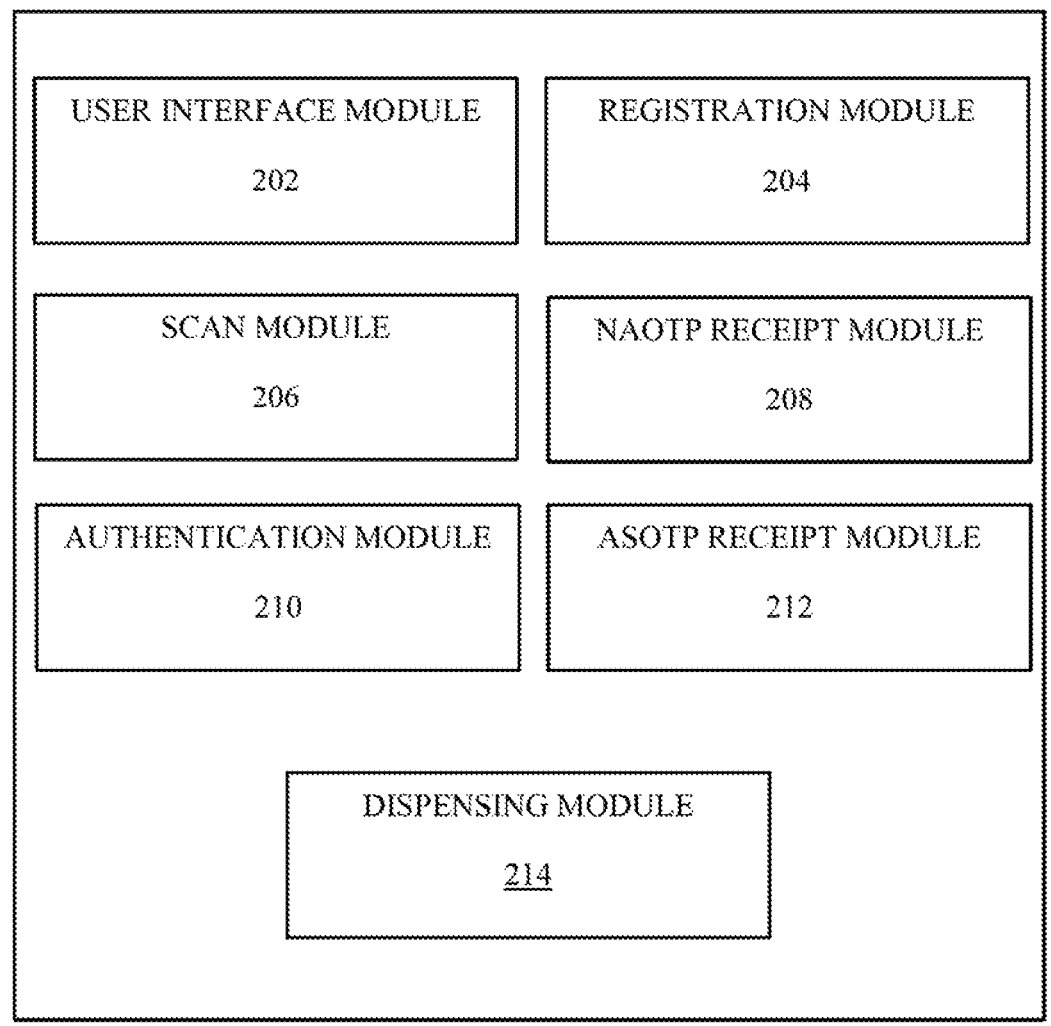
FIG. 2 illustrates a system block diagram illustrating various components, according to an embodiment of the disclosure.

FIG. 2 is a system 200 illustrating various components for creating account at a financial institution using the computing machine 104. In an example, the system 200 is in communication with a computing machine 104 and/or with a server 106 and is coupled through a communication network as discussed above. Alternatively, the system 200 may be implemented in the computing machine 104.

The system 200 includes one or more processor(s) 202. The one or more processor(s) 202 may be implemented as one or more microprocessors, microcomputers, microcontrollers, digital signal processors, central processing units, logic circuitries, and/or any devices that manipulate data based on operational instructions.

Among other capabilities, the one or more processor(s) 202 are configured to fetch and execute computer-readable instructions stored in a memory 204 of the system 200 or the computing machine 104. The memory 204 may store one or more computer-readable instructions, which may be fetched and executed to create an account with a financial institution. The memory 204 may include any non-transitory storage device including, for example, volatile memory such as RAM, or non-volatile memory such as EPROM, flash memory, and the like.

The system 200 also includes an electronic interface(s) 206, or, simply, interface(s) 206. The interface(s) 206 may include a variety of interfaces, for example, interfaces for data input and output devices, referred to as I/O devices, storage devices, a document scanner 208, and the like. The interface(s) 206 facilitate communication of the system 200 or the computing machine 104 with various devices coupled to the computing machine 104. The interface(s) 206 may also provide a communication pathway for one or more components of the system 200 or the computing machine 104. Examples of such components include, but are not limited to, the financial transaction engine(s) 108.

In an implementation, financial transaction engine(s) 108 further includes an interface module 210, a scan module 212, a verification module 214, a registration module 216, and a dispensing module 218.

Further, in the present embodiment shown in FIG. 2, the system 200 includes data 220 that is either stored or generated as a result of functionalities implemented by any of the module(s) of the financial transaction engine(s) 108. Further, the data 220 may include identification information data 222, and other data 224. It should be noted that although the present approach has been described in the context of a computing machine implemented for a financial institution, it may be also implemented on any other device with a programmable memory and a processor, without deviating from the scope of the present disclosure.

In operation, when an applicant having an intention of creating or opening an account using the computing machine 104 interacts with the computing machine 104, the interface module 210 of the system 200 displays an electronic form or application form on the interface(s) 206, to receive identification information from the user. In an example, the interface module 210 may display a blank application form, having one or more fields to receive identification information from the applicant. In said example, the interface module 210 can guide, instruct, and respond to the applicant for submitting the identification information in the application form.

Once the identification information is submitted along with the application form, the scan module 212 prompts the applicant to submit at least one of the identification documents, such as driving licensee, Permanent Account Number (PAN) card, Identity (ID) card, passport, Aadhar card, voting card, electricity bill and the like, in a scanning orifice or opening (not shown in figures) provided in the computing machine 104. Upon insertion of the identification document, the scan module 212 implements the document scanner 208 to scan or capture at least a part of the identification information from the identification document, and then ejects the identification document from the computing machine 104.

Following the capturing of the at least a part of identification information, the scan module 212 prompts the applicant to provide signature over the interface(s) 206. In one example, the computing machine 104 may include devices such as digital-Slate/Pen for receiving digital signature from the applicant. In addition to the receipt of the applicant's signature, the scan module 212 may prompt the user to provide or submit biometric details over a biometric reader (not shown in figures) provided on or coupled to the computing machine 104.

Once the signature, biometric details, and/or identification information are received, the server 106 generates and transmits a Document Verification One Time Password (DVOTP) to applicant's communication device number submitted or register through the application form. Following the transmission of the DVOTP, the server 106 triggers the verification module 214 to prompt the applicant 102 to submit the DVOTP for initiating the verification process.

Upon submission of the DVOTP, the verification module 214 transmits any or both of the identification information received from the applicant through the form, and the at least a part of the identification information, to the server 106 of the financial institution. The server 106 is being configured to verify the identification information received from the applicant and/or the at least a part of the identification information captured from the identification document against applicant data maintained at the server 106, or at different respective authority websites, or both.

Upon successful verification, the server 106 can directly create the account of the applicant 102 or communicate to the registration module 216 to create the account of the applicant with the financial institution. Following the creation of the account, the server 106 transmits Account Confirmation One Time Password (ACOTP) to applicant's communication device number. Once the customer receives and submits the ACOTP the account will be activated immediately (or within 24 hours) and then finally dispenses the instant kit.

Thereafter, the server 106 triggers the registration module 216 to receive the ACOTP from the applicant 102. Upon receipt of the ACOTP from the applicant 102, the registration module 216 triggers the dispensing module 218.

The dispensing module 218 associates one or more attributes of the identification information of the applicant 102 with an account opening envelope present in the computing machine 104, and dispenses the account opening envelope, consisting of a debit Card, a Credit Card, personal identification numbers (PINs), passbook, and the like, from the computing machine 104. In an implementation, after the creation of the account or dispense of the account opening envelope, the applicant 102 becomes customer of the financial institution and therefore can perform regular financial transactions using the computing machine 104.

However, in case of an unsuccessful verification, the server 106 or the verification module 214 generates and transmits a new account reference number (NARN) to applicant's communication device number. In an optional implementation, the server 106 or the verification module 214 may also transmit a message to the customer that 'verification is pending and financial institution personal will contact at the earliest' or reference number. Then, the unsuccessful verification details may be forwarded to a dedicated financial institution personal to contact with the applicant to complete the verification process. After successful verification, the server 106 or the verification module 214 may communicate to the applicant to collect account opening envelope from the computing machine 102. The account opening envelope may be dispensed by the computing machine 102 when the registration module 216 or the dispending module 218 receives the ACOTP from the applicant.

Thus, with the present disclosure, the computing machine 104 becomes capable of creating a new account of an applicant with a financial institution. This not only creates a new account but reduces the paper work, thereby reducing errors and increasing the efficiency of the financial institutions. Overall, the proposed computing machine 104 provides a more integrated system 200 for recording account opening applications and activating accounts in real time. The integration and automation enabled by the proposed computing machine 104 increases accuracy and efficiency, as different financial institution's employees do not have to alternate between multiple electronic and paper systems to open/create the account, to prepare the account opening envelopes, and to dispatch the account opening envelopes to the applicants.

Figure 3:
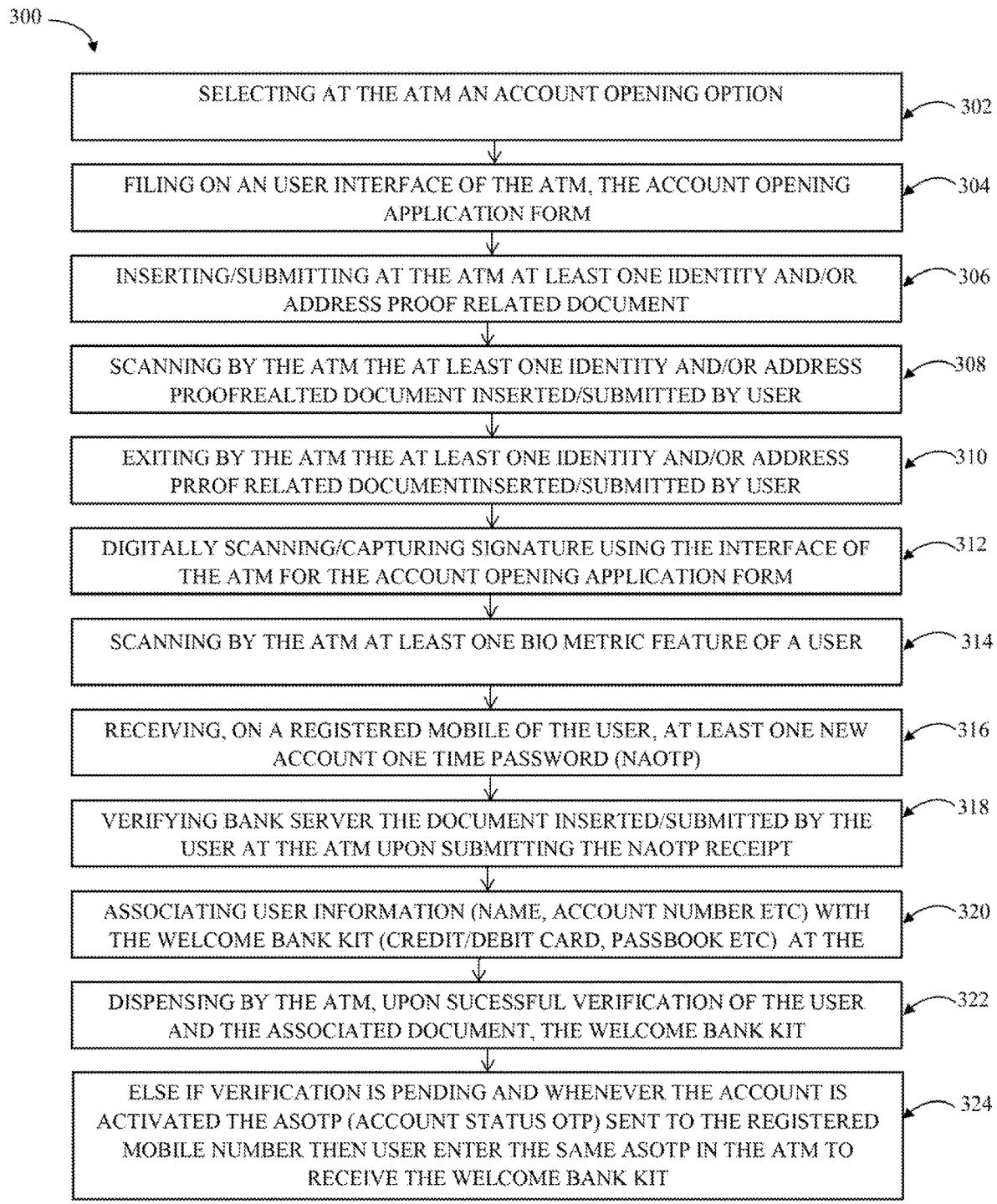
FIG. 3 illustrates a flowchart illustrating a method of creating an account at a financial institution.
Figure 4:
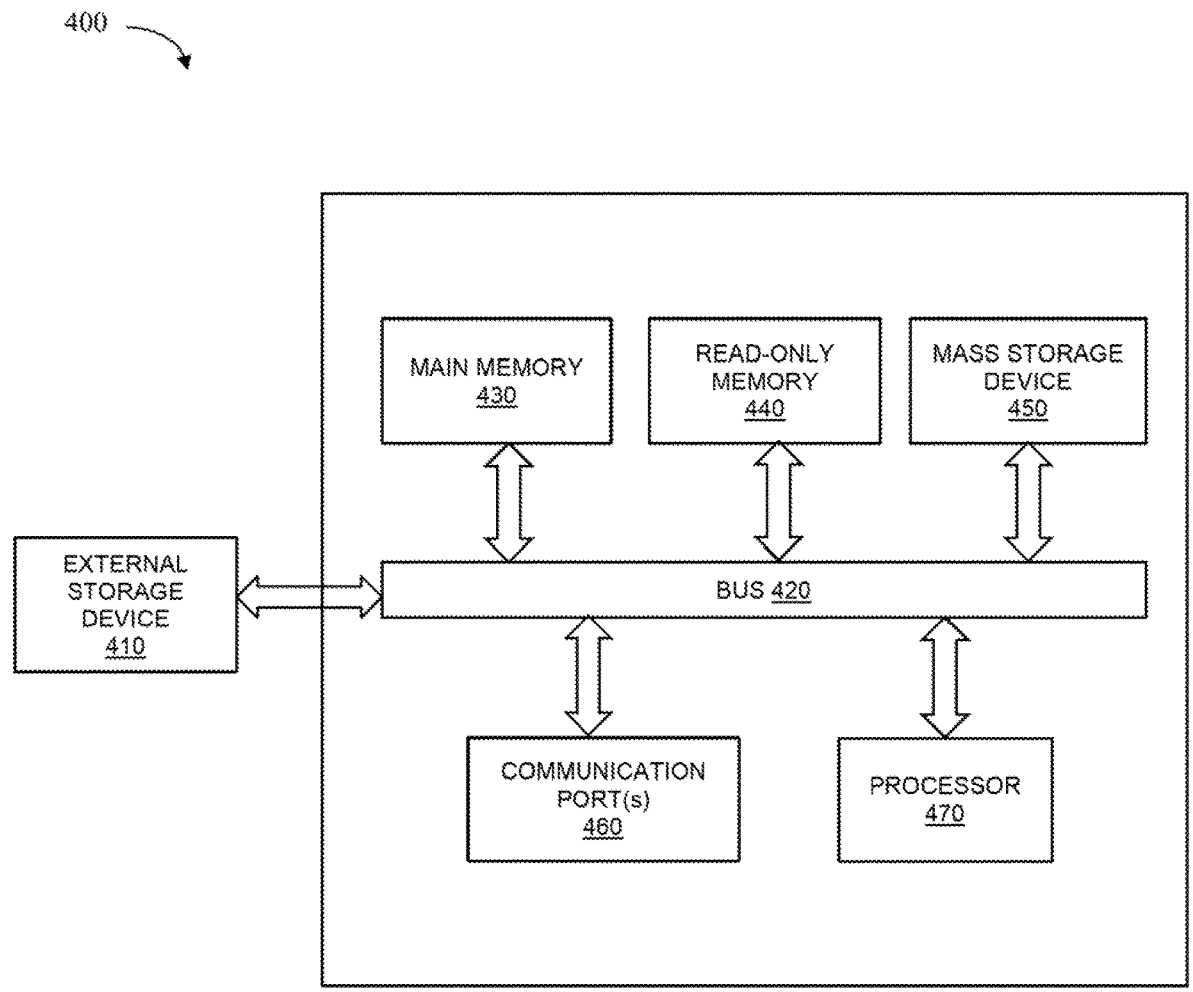
FIG. 4 illustrates a flowchart illustrating a method of creating an account with a financial institution using an automated teller machine, in accordance with an exemplary implementation of the present disclosure.

FIGS. 3 and 4 illustrate exemplary flow diagram showing different steps of methods 300 and 400, respectively, for creating an account at a financial institution using the computing machine 104. The order in which the methods 300 and 400 are described is not intended to be construed as a limitation, and any number of the described method blocks may be combined in any order to implement the methods, or an alternative method. Furthermore, methods 300 and 400 may be implemented by processing resource or computing device(s) through any suitable hardware, non-transitory machine readable instructions, or combination thereof.

It may also be understood that methods 300 and 400 may be performed by programmed computing devices, such as computing machine 104 or the system 200 as depicted in FIGS. 1-2. Furthermore, the methods 300 and 400 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 300 and 400 are described below with reference to the computing machines used in financial institutions as described above; other suitable systems for the execution of these methods may also be utilized. Additionally, implementation of these methods is not limited to such examples.

FIG. 3 is a flowchart illustrating a method for creating an account at a financial institution using the computing machine 104. The flowchart is described with respect to financial account creation case scenario. Here, a request for creation of account is received at the computing machine 104 from an applicant At block 302, a request to create an account with a financial institution (FI), is received at the computing machine 104 from the applicant 102.

At block 304, an application form is provided, through an electronic interface 206 of the computing machine 104, to the applicant 102 for receiving identification information of the applicant 102, where the identification information including a communication device number associated with the applicant 102.

At block 306, the identification information from the applicant is received at the computing machine 104 by means of the application form.

At block 308, upon receipt of the identification information, the computing machine 104 prompts the applicant over the electronic interface to submit identification document in the computing machine. Upon submission of the identification document, the computing machine 104 captures at least a part of the identification information from the identification document.

At block 310, any or both of the identification information received from the applicant through the application form, and the at least a pan of the identification information captured from the identification document, are transmitted to a server of the financial institution. In an implementation, the server is configured to verify the identification information received from the applicant and/or the at least a part of the identification information captured from the identification document, against applicant data maintained at the server 106, or at different respective authority websites, or both.

At block 312, based on the successful verification, the computing machine 104 transmits an Account Confirmation One Time Password (ACOTP) to a communication device number of the applicant. Said communication device number is retrieved from the application form, where the account is being created at the server of financial institution.

FIG. 4 is a flowchart for creating an account at a financial institution using a computing machine implemented as an automated teller machine (ATM) of a bank in a case scenario. Here a request for account creation is received from the applicant 102.

At block 402, the ATM receives a selection for opening an account, from the applicant.

At block 404, upon receipt of the selection, the ATM presents an application form on an interface of the ATM. In an example, the application form may include one or more fields requiring applicant's identification information. In an exemplary implementation, an imaging device may be coupled to or implemented on the ATM to capture an image/photo of the applicant and include the capture image in an appropriate field of the application form.

At block 406, the ATM receives a completed filled application form, from the applicant. Following this, the ATM also prompts to submit, in the ATM, an identification document satisfying the criteria of at least one of an identity proof related document and an address proof related document.

At block 408, the ATM scans the received identification document to generate a softcopy of the identification document. In an example, from the softcopy of the identification document, the ATM captures at least a part of the identification information associated with the applicant. In an exemplary implementation, when the applicant submits a Permanent Account Number (PAN) card or Aadhar card as the identification document, the ATM may capture the PAN number or the Aadhar card number, as the at least a part of the indemnification information, and automatically fills the captured number in an appropriate field in the application form. With such automatic filling of the application form's fields, the applicant would not be able to modify or mislead the ATM for critical details required for the verification of the identity of the applicant.

In another exemplary implementation, the ATM is adapted to perform a preliminary verification of the at least a part of the identification information captured from the identification document. For example, the ATM machine may capture the name of the applicant, as the at least a part of the identification information, and compare the captured name with the name entered by the applicant in the application form, to perform the preliminary verification. In case the name captured from the identification document is different from the name present in the application form, the system may reject the identification document and prompt the applicant to either correct the name in the application form or submit another identification document. The process of creating the account with the bank will proceed further, upon the successfull preliminary verification of the identification document, or the contents present in the application form, or both.

At block 410, upon capturing the at least a part of the identification information, the ATM ejects the identification document out of the ATM.

At block 412, the ATM prompts the applicant to digitally sign the application form using the interface(s) 206 of the ATM. The ATM may be configured to receive signature from the applicant using devices such as digital-Slate/Pen.

At block 414, the ATM prompts the applicant to submit the biometric features at the through a biometric reader provided on or coupled to the ATM. In another exemplary embodiment, the ATM can be associated with a camera to capture images or photos of the applicant. In another exemplary embodiment, the ATM can be associated with card reader for reading the applicant's identification information, and transmits the identification information of the applicant to a bank server.

At block 416, upon receipt of all or any of the identification document copy, digital sign, and biometric features of the applicant, the ATM generates a document verification one time password (DVOTP) from a bank server and transmits the same to applicant's registered mobile number submitted at the time of filing of the application form. The applicant may then receive DVOTP on the registered mobile number from the ATM.

At block 418, the ATM prompts the applicant to submit the DVOTP. Upon submission and validation of the DVOTP, the ATM validates the identification information and the at least a part of identification information by connecting to external websites or portals from the bank server. For example, if the ATM needs to validate the PAN number, the ATM connects to Income Tax Department website and provides the validation result for the applicant's pan number to the bank server. Based on the validation result, the ATM can automatically accept/reject the applicants's application or system, and may prompt user to provide valid identification documents.

Upon successful verification, the bank server can directly create the account of the applicant. Following the creation of the account, the bank server transmits an Account Confirmation One Time Password (ACOTP) to applicant's communication device number. Thereafter, the server 106 prompts the applicant to provide the ACOTP.

At block 420, upon receipt of the ACOTP from the applicant 102, the ATM prepares the account opening envelope. The ATM may dispense two type of kits: (i) ready-made account opening envelope and (ii) dynamically prepared account opening envelope. For first type of envelope, if the bank is providing the QR or bar for any other readable code) coded sealed account opening envelope, then the ATM can simply read the barcode or quick response (QR) code (or any other readable code) on the account opening envelope and get the card number and account number or customer ID from the barcode or QR code and attach to the application form.

Once the customer receives and submits the ACOTP the account will be activated immediately (or within 24 hours) and then finally dispenses the instant kit.

For second type of envelope, the ATM according to the present disclosure is adapted to enable priming of the account holder (applicant) name of the debit/credit card/passbook that is to be dispensed along with the account opening envelope following the opening/creating new account. In another example, in order to print the applicant/customer name on the debit/credit card/passbook, the ATM may include a special hardware dedicatedly adapted to print the applicant/customer name on the debit card with the help of laser beam, heating, induction, or any other known or new technology.

Once the name of the applicant/customer is printed on debit/credit card/passbook, the ATM can be adapted to customize the account opening envelope, and associate with the applicant/customer (or new account created/opened by the applicant/customer). In order to achieve this, an envelope preparing mechanism to dynamically prepare the account opening envelope by the ATM itself by collecting/fetching the required items front different collection containers inside the ATM, can be provided/facilitated/ configured in the ATM. In the present exemplary implementation, various new containers may be provided in the ATM along with the existing containers like cash containers. In an example, first container may include debit cards, second container may include credit cards, third container may include passbooks fourth container may include instruction manuals, and the like container may be provided for PIN and/or account related information document.

Once these documents are collected from the different containers, the above mentioned envelope preparing mechanism may collate the collected documents in the account opening envelope. In an example, the account opening envelope may include a debit/credit card, account information document(s), a pin number document, an instruction manual, a cheque book, and so forth.

In an exemplary implementation, the sealed account opening envelope may include, but not limited to, a quick response (QR) code, or a barcode, or any other readable code. Such QR code or bar code (or any other readable code) may be placed on the account opening envelope associated with the customer/applicant (or new account created/opened by the customer/applicant). Such QR code or bar code (or any other readable code) may include the information about a card number and/or, a customer ID, and/or an account number of the new account opening envelope and associated to the customer/applicant whose new account created/opened. For example, before dispensing the account opening envelope from the ATM, the above mentioned envelope preparing mechanism, present in the. ATM, reads the QR code or the bar code (or any other readable code) which is placed on the account opening envelope, to get the card number and the bank account number which are included in the account opening envelope.

For the sake of brevity, in the above mentioned implementation, once the documents and applicant's identification information is verified and succeeded, then the account number will be generated dynamically and the ATM can start printing the customer name on the card and filially the ATM will attach the account number/customer ID and card number to the application form. Once the ATM attaches the account number/customer ID and card number, said mechanism prints the customer name on the debit card and proceed with preparation of the account opening envelope. Upon printing the name on the debit card, said mechanism collect the documents, including include a debit card, account information document(s), a pin number document, an instruction manual, a cheque book, and so forth, from the respective collection containers/boxes, and collate these documents in the account opening envelope, seals the account opening envelope, generates the computer readable code, and then prints the computer readable code on the sealed account opening envelope.

At block 422, once the account opening envelope is sealed, the ATM dispenses account opening envelope from the ATM.

At block 424, in case of unsuccessful/pending verification, the ATM may generate a new account reference number (NARN) and transmit to the mobile number (which is mentioned in the new account opening form) and after activation of account the, server transmit the Account Confirmation One Time Password (ACOTP) to the mobile number (which is mentioned in the new account opening form). In an optional implementation, the bank server or the ATM may also transmit a message to the customer/applicant that 'verification is pending and financial institution personal will contact at the earliest'. Then, the unsuccessful verification details may be forwarded to a dedicated financial institution personal to contact with the applicant to complete the verification process. After successful verification the bank server will send the Account Confirmation One Time Password (ACOTP) to the applicant/customer mobile number, the bank server or the ATM may communicate to the applicant/customer to collect account opening envelope from the any or specific ATM. The account opening envelope may be dispensed by the ATM, when the ATM receives the ACOTP from the applicant/customer.

Thus, with the present disclosure, a computing machine becomes capable of creating a new account of an applicant with a financial institution. This not only creates a new account but reduces the paper work, thereby reducing errors and increasing the efficiency of the financial institutions. Overall, the proposed computing machine provides a more integrated system for recording account opening applications and activating accounts in real time. The integration and automation enabled by the proposed computing system increases accuracy and efficiency, as different financial institution's employees do not have to alternate between multiple electronic and paper systems to open/create the account, to prepare the account opening envelopes, and to dispatch the account opening envelopes to the applicants.

For a person skilled in the art, it is understood that the use of phrase(s) "is", "are", "may", "can", "could", "will", "should" or the like is for understanding various embodiments of the present disclosure and the phrases do not limit the disclosure or its implementation in any manner.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For if example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "receiving" or "providing" or "prompting" or "transmitting" or "presenting" or "enabling" or "associating" or "dispensing" or the like, refer to the action and processes of computing machine, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to a system/apparatus/machine for performing the operations discussed herein above. This system/apparatus/machine may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The terminology used herein is fur the purpose of describing particular embodiments only and is not intended to be limiting of the present disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or appreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein mar be subsequently made by those skilled in the art which are also intended to be encompassed by the following claims.

I claim:

1. A method comprising:
   receiving, at a computing machine, from an applicant, a request to create an account with a financial institution
   providing, through an electronic interface of the computing machine, an application form to the applicant for receiving identification information of the applicant;
   receiving, at the computing machine, the identification information from the applicant by means of said application form;

upon receipt of the identification information, prompting the applicant over the electronic interface of the computing machine to submit an identification document and receiving, in the computing machine, the identification document to capture at least a part of the identification information from the identification document;

transmitting any or both of the identification information received from the applicant through the form, and the at least a part of the identification information, to a server of the financial institution, said server being configured to verify the identification information received from the applicant; and based on successful verification, transmitting an Account Confirmation One Time Password (ACOTP) to a communication device number of the application, said ACOTP representing a confirmation of account creation to the applicant, said account being created at the server; and upon successful verification of the identification information and successful creation of the account, printing name of the applicant on a debit card present inside the computing machine;

preparing an account opening envelope in the computing machine, wherein the preparing comprising collecting documents from different collection containers present in the computing machine and collating the collected documents in the account opening envelope, and wherein the account opening envelope comprises the debit card and one of an account information document(s), a pin number document, an instruction manual, and a cheque book;

generating an account number dynamically and read, a debit card number on which the applicant's name is printed, to generate a computer readable code, wherein the computer readable code includes one of a quick response (QR) code and a bar code, the computer readable code representing the account number and the number of the debit card;

printing the computer readable code on the account opening envelope; and dispensing the account opening envelope from the computing machine.

2. The method as claimed in claim 1, wherein the method further comprises the steps of:

upon capturing the at least a part of the identification information from the identification document, ejecting the identification document from the computing machine and transmitting a document verification one time password (DVOTP) to the communication device number of the applicant;

prompting the applicant over the electronic interface to submit the DVOTP for proceeding with verification of the identification information; and enabling validation of the submitted DVOTP to further enable the step of transmitting.

3. The method as claimed in claim 1, wherein the method comprising, after receiving the identification information in the application form, receiving signature on the application form using the electronic interface of the computing machine.

4. The method as claimed in claim 1, wherein the method comprising, after receiving the identification information in the application form, receiving biometric feature of the applicant at the computing machine for attaching with the application form.

5. The method as claimed in claim 1, further comprising transmitting, to the communication device number of the applicant, a message indicating pending status of the application form when the verification is unsuccessful or pending.

6. The method as claimed in claim 1, wherein the account created to the applicant is interoperable/portable with at least one financial institution, and wherein the account created comprise of at least an account number configured to be interoperable/portable with at least two financial institutions.

7. A computing machine comprising:

a non-transitory storage device having embodied therein one or more routines operable to open an account with a financial institution; and one or more processors coupled to the non-transitory storage device and operable to execute the one or more routines, wherein the one or more routines include:

an interface module comprises at least a computing machine with display, which when executed by the one or more processors, receives a request from an applicant to create an account with a financial institution, and provides an application form to the applicant for receiving identification information of the applicant;

a scanning module comprises a scanning device, which when executed by the one or more processors, receives in the computing machine the identification document to scan at least a part of the identification information from the identification document;

a verification module comprises a server configured to receive, verify and transmit data, which when executed by the one or more processors, transmits any or both of the identification information received from the applicant through the form, and the at least a part of the identification information, to a server of the financial institution, said server being configured to verify the identification information receives from the applicant; and a registration module comprises a server configured to receive, process and transmit data, which when executed by the one or more processors, transmits an Account Confirmation One Time Password (ACOTP) to a communication device number of the applicant, said ACOTP) representing a confirmation of account creation to the applicant, said account being created at the server based on successful verification; and upon successful verification of the identification information and successful creation of the account, print a name of the applicant on a debit card present inside the computing machine;

prepare an account opening envelope in the computing machine, wherein the preparing comprising collecting documents from different collection containers present in the computing machine and collating the collected documents in the account opening envelope, and wherein the account opening envelope comprises the debit card and one of an account information document(s), a pin number document, an instruction manual, and a cheque book;

generate an account number dynamically and read a debit card number on which the applicant name is printed, to generate a computer readable code, wherein the computer readable code includes one of a quick response (QR) code and a bar code, the computer readable code representing the account number and the number of the debit card;

print the computer readable code on the account opening envelope; and dispense the account opening envelope from the computing machine.

8. The computing machine as claimed in claim 7, wherein the computing machine is one of an automated teller machine, a standalone machine, a dedicated machine, a workstation, a smart phone, a cash dispenser machine, and a handheld device, and wherein the computing machine comprises a biometric reader to receive biometric feature of the applicant at the computing machine for attaching with the application form.

9. The computing machine as claimed in claim 7, wherein upon capturing the at least a part of the identification information from the identification document, the scanning device of the computing machine is to:
    eject the identification document from the computing machine and transmitting a new account one time password (DVOTP) to the communication device number of the applicant;

prompt the applicant over the electronic interface to submit the DVOTP for proceeding with verification of the identification information; and
    enable validation of the submitted DVOTP to further enable the step of transmitting.

10. The computing machine as claimed in claim 7, wherein the account created to the applicant is interoperable/portable with at least one financial institution, and wherein the account created comprise of at least an account number configured to be interoperable/portable with at least two financial institutions.

* * * * *